US010558630B2

(12) United States Patent
Ajmera et al.

(10) Patent No.: US 10,558,630 B2
(45) Date of Patent: *Feb. 11, 2020

(54) ENHANCING TEXTUAL SEARCHES WITH EXECUTABLES

(71) Applicant: International Business Machines Corporation, Armonk, NY (US)

(72) Inventors: Jitendra Ajmera, New Delhi (IN); Sunil Goyal, Gurgaon (IN)

(73) Assignee: International Business Machines Corporation, Armonk, NY (US)

( * ) Notice: Subject to any disclaimer, the term of this patent is extended or adjusted under 35 U.S.C. 154(b) by 260 days.

This patent is subject to a terminal disclaimer.

(21) Appl. No.: 14/454,745

(22) Filed: Aug. 8, 2014

(65) Prior Publication Data

US 2016/0042035 A1    Feb. 11, 2016

(51) Int. Cl.
G06F 7/00         (2006.01)
G06F 17/30        (2006.01)
(Continued)

(52) U.S. Cl.
CPC ........ *G06F 16/2228* (2019.01); *G06F 16/248* (2019.01); *G06F 16/951* (2019.01)

(58) Field of Classification Search
None
See application file for complete search history.

(56) References Cited

U.S. PATENT DOCUMENTS 7,831,609 B1 * 11/2010 Alexander ........ G06F 17/30887
707/765
2006/0085466 A1 * 4/2006 Ye .......................... G06F 17/242
(Continued)

FOREIGN PATENT DOCUMENTS

WO    2004013772 A2    2/2004
WO    2012059879 A2    5/2012
WO    2012061275 A1    5/2012

OTHER PUBLICATIONS

Adeel et al., "Math Go! Prototype of a Content Based Mathematical Formula Search Engine," Journal of Theoretical and Applied Information Technology, 2008, p. 1002-1012.
Google, "Geometry Calculator," Google Support, 2014, p. 1, https://support.google.com/websearch/answer/4572089?hl=en&ref_topi, Accessed on May 15, 2014.
Kim et al., "Mathematical Equation Retrieval Using Plain Words as a Query," CIKM'12, Oct. 29-Nov. 2, 2012, ACM.
(Continued)

*Primary Examiner* — Tuan A Pham
(74) *Attorney, Agent, or Firm* — Ewa M. Wozniak

(57) ABSTRACT

Receiving a search request by a computer. Parsing text-based search terms from the search request. Searching documents in a document index based on the text-based search terms. Transmitting to a user device a list of documents identified by the search. Receiving, from the user device, a selection of one of the identified documents. Parsing executable-based search terms from the search request. Identifying content defining an executable in the selected document. Forming a display element from the executable. Identifying and associating variable names and variable values in the search query with variable names and variable values in the executable. Forming a statement to solve from the search query. Solving the statement to solve. Substituting the variable values and the statement solution for corresponding variable names in the display element. Embedding the display element in the selected document, and transmitting the selected document with the embedded display element to the user device.

15 Claims, 4 Drawing Sheets

(51) Int. Cl.
*G06F 16/22* (2019.01)
*G06F 16/248* (2019.01)
*G06F 16/951* (2019.01)

(56) References Cited

U.S. PATENT DOCUMENTS

| | | | | |
|---|---|---|---|---|
| 2006/0235823 | A1* | 10/2006 | Chong | G06F 17/30477 |
| 2007/0038616 | A1* | 2/2007 | Guha | G06F 16/3338 |
| 2007/0100915 | A1* | 5/2007 | Rose | G06F 17/30873 |
| 2007/0208714 | A1* | 9/2007 | Ture | G06F 17/3064 |
| 2009/0132544 | A1* | 5/2009 | Hattori | G06F 17/30445 |
| 2010/0114878 | A1* | 5/2010 | Lu | G06F 16/334 707/723 |
| 2010/0198816 | A1* | 8/2010 | Kwan | G06F 17/30696 707/723 |
| 2010/0205198 | A1* | 8/2010 | Mishne | G06F 16/3346 707/759 |
| 2010/0287175 | A1* | 11/2010 | Beaudreau | G06F 17/30864 707/759 |
| 2010/0293179 | A1* | 11/2010 | Chaudhuri | G06F 17/30864 707/759 |
| 2010/0332515 | A1* | 12/2010 | Carraher | G06F 17/30864 707/769 |
| 2011/0004588 | A1* | 1/2011 | Leitersdorf | G06F 17/30864 707/711 |
| 2011/0145229 | A1* | 6/2011 | Vailaya | G06F 17/30675 707/723 |
| 2011/0161352 | A1* | 6/2011 | de Castro Alves | G06F 16/25 707/769 |
| 2012/0246138 | A1* | 9/2012 | Carraher | G06F 17/30864 707/709 |
| 2013/0166573 | A1* | 6/2013 | Vaitheeswaran | G06F 16/242 707/749 |
| 2013/0290366 | A1* | 10/2013 | Boyle | G06F 17/2785 707/767 |
| 2014/0115000 | A1* | 4/2014 | Buchmann | G06F 17/3043 707/759 |

OTHER PUBLICATIONS

Kohlhase et al., "MathWebSearch 0.4 a Semantic Search Engine for Mathematics," Mar. 17, 2008, p. 1-13, Rev: 366.

Youssef, "Search Systems for Mathematical Equations," p. 1, Department of Computer Science, The George Washington University, Washington, DC., Jun. 2002.

IBM, List of IBM Patents or Patent Applications Treated as Related, Appendix P, dated Feb. 16, 2017, 2 pages.

Ajmera et al., "Enhancing Textual Searches With Executables," U.S. Appl. No. 14/681,123, filed Apr. 8, 2015, 30 pages.

* cited by examiner

ENHANCING TEXTUAL SEARCHES WITH EXECUTABLES

BACKGROUND

The present invention relates generally to the field of natural language processing of a search query, and more particularly to determining a mathematical equation from a search query, and executing the equation in a search result web page.

SUMMARY

Embodiments of the present invention disclose a method, computer program product, and system for processing a search query. A search request is received by a computer. Parsing text-based search terms from the search request. Searching documents in a document index based on the text-based search terms. Transmitting to a user device a list of documents identified by the search. Receiving, from the user device, a selection of one of the identified documents. Parsing executable-based search terms from the search request. Identifying content defining an executable in the selected document. Forming a display element from the executable. Identifying and associating variable names and variable values in the search query with variable names and variable values in the executable. Forming a statement to solve from the search query. Solving the statement to solve. Substituting the variable values and the statement solution for corresponding variable names in the display element. Embedding the display element in the selected document, and transmitting the selected document with the embedded display element to the user device.

DETAILED DESCRIPTION

Figure 1:
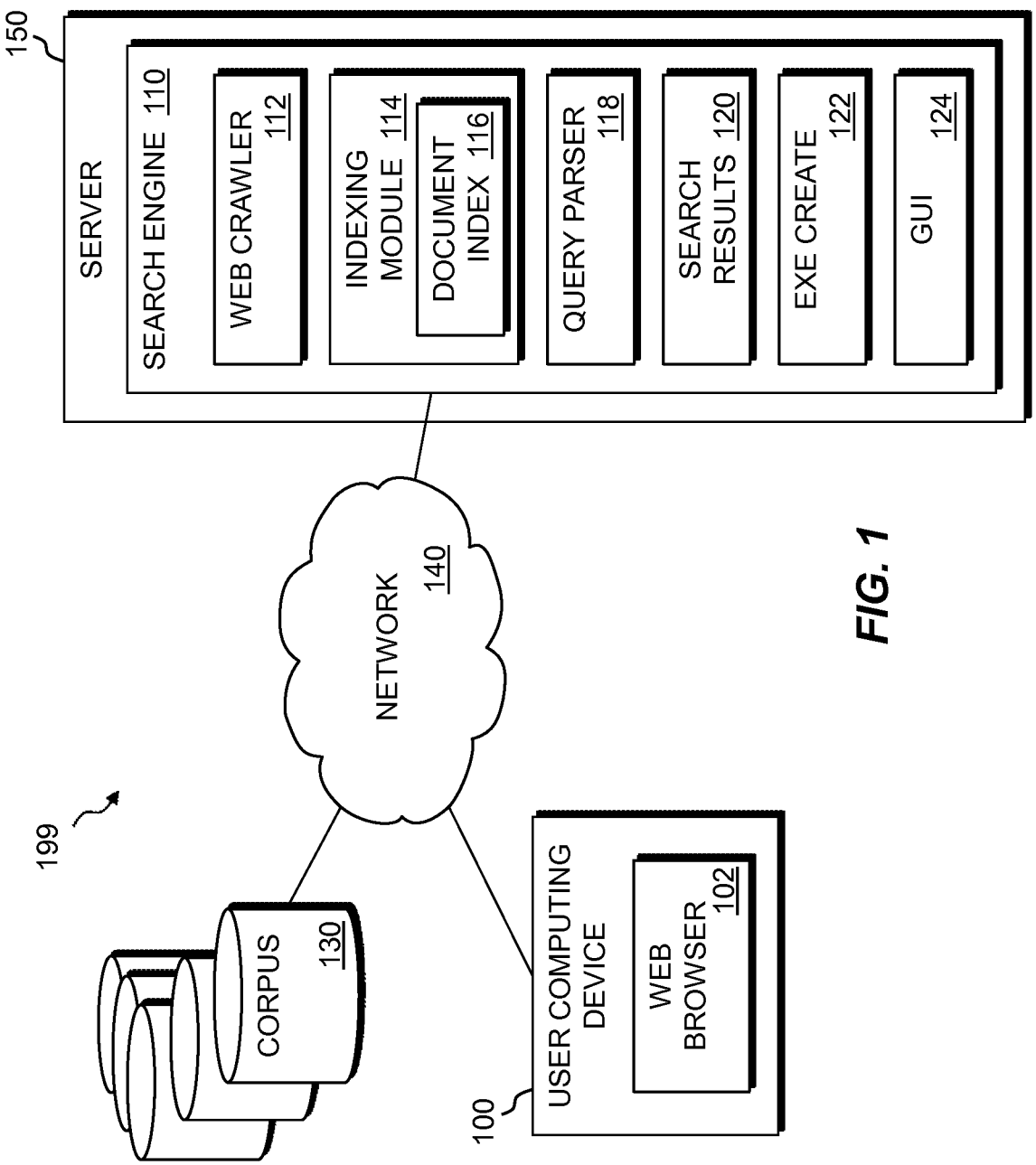
FIG. 1 is a functional block diagram illustrating an enhanced search environment, in accordance with an embodiment of the present invention.

Search engines typically include two components: a web crawler, and a query processor. The web crawler may systematically browse web pages on a network, for example, web pages on the Internet, and perform a web indexing function to generate an index of web pages. The query processor may receive a search query, for example, from a user computer via a search engine web browser interface page, may process the search query to produce search terms that are in alignment with the web page index, identify web pages that contain the search terms, rank the identified web pages, and return the ranked results to the user computer web browser.

The web indexing function may be quite complex and incorporate interdisciplinary concepts from linguistics, cognitive psychology, mathematics, informatics, physics, and computer science. Most search engines focus on the full-text indexing of online, natural language documents. For example, the indexing function may retrieve a web page, and tokenize, parse, and further process the text content, according to, for example, natural language rules.

The query processor may parse the search query in a manner complimentary to the web indexing function to ensure the search terms from the processed query effectively align with the index created by the web indexing function. For example, the query parser may tokenize, parse, and further process received search queries, according to natural language rules. The parsing may further include, for example, stop list and word stem processing, query expansion to include synonyms and related terms in the search, query term weighting, etc. After the search query has been parsed, the query processor may use the resulting search terms to search the web page index, and return ranked results to the requesting web browser.

Special purpose search engines have been developed to, for example, perform searches of mathematical equations and formulae, and programming code. For example, "Mathematical Equation Retrieval Using Plain Words as a Query," 2012, by S. Kim, et al., describes a system to retrieve mathematical equations and formulae based on plain word search queries. The system uses an approach in which a corpus of mathematical formulae are first converted to a standard plain language format, which the authors refer to as math sentences. The math sentences may be, for example, MathML, or Mathematical Markup Language, which is an application of XML for describing mathematical notations capturing an equation's structure and content. The math sentences may be processed and indexed, for example, based on numbers, operators, and formula structure. Plain language formula and equation search queries may be parsed in a manner similar to a standard text based search query, and, based on the resulting search terms, equations and formulae are identified in the index, the search results may be ranked, and the ranked results presented to the requestor.

Another example of a system for performing searches of mathematical equations and formulae is described in "MathGO! Prototype of a Content Based Mathematical Formula Search Engine," 2008, by M Adeel, et al. In this system, the mathematical markup language to encode equations and formulae is parsed, based on regular expressions specific to the markup language, such as the MathML or OpenMath markup languages. For various markup language expressions, plain language keywords are entered into a search index. Each search query is similarly processed to convert the query to the keywords of the search index. After the query is converted, equations and formulae are identified in the index, the search results may be ranked, and the ranked results presented to the requestor. Those of skill in the art will recognize that other approaches may be used to perform searches of mathematical equations and formulae.

There are numerous publically available special purpose search engines that have been developed to perform searches of programming code. One example is the Ohloh® code search engine, supported by Black Duck Software, Inc. The search engines may perform searches on associated corpuses of code in different programming languages, and a few allow for searches of an individual's code base. These search engines may operate in the same or similar manner as common text-based search engines. Many of the code search engines specifically allow special characters in the search queries, such as ?, /, #, %, and other special characters that may be found in programming languages.

Embodiments of the invention recognize that, in addition to retrieving equations, formulae, and code from a corpus, based on a search query, it may be advantageous to "execute" the retrieved equations and formulae, if sufficient information is included in the query, and return the execution results to the requestor. Similarly, it may be advantageous to identify procedures, or rules, in a corpus, based on a search query, and return the proper procedure to follow, if sufficient information is included in the query. As used herein, equation and formula are considered to be synonyms, and the term equation will encompass both equation and formula. As used herein, equations, rules, and other constructs on a web page for which user supplied values may be used, for example, to solve an equation, to represent variables in code, to identify a specific procedure, etc., may be referred to as "executables" and may form the basis of code, for example, Java® code, that may be embedded within a web page returned to a web browser.

In various embodiments, a search engine returns results based on a natural language search query. If the search query can be parsed to a request to solve an equation, to execute code, or to identify a specific procedure, then if a web page result selected by the requestor contains the equation, code, or procedure, the search engine may execute the equation, code, or specify the procedure with, for example, the values supplied in the search query.

FIG. 1 is a functional block diagram illustrating an enhanced search environment 199, in accordance with an embodiment of the present invention. Enhanced search environment 199 may include user computing device 100, search engine 110 residing on server 150, and corpus 130, all interconnected over network 140.

Network 140 can be, for example, a local area network (LAN), a wide area network (WAN) such as the Internet, or a combination of these, and can include wired, wireless, or fiber optic connections. In general, network 140 can be any combination of connections and protocols that will support communications between user computing device 100, search engine 110, and corpus 130, in accordance with one or more embodiments of the invention.

User computing device 100 represents a source for a search query that is received by search engine 110, and a platform that may display the execution of an equation, or code, in accordance with one or more embodiments of the invention. In an embodiment, user computing device 100 includes a web browser 102. Web browser 102 represents a GUI that may accept user input, for example, a search query, and transmit the query to search engine 110, for example, via network 140. In addition, as will be described in more detail below, web browser 102 may execute code, for example, Java®, HTML, or XML code, to display an execution of an equation, or code that may be parsed in the search query. In an exemplary embodiment, web browser 102 may be any of the available popular web browsers, such as Firefox®, Bing®, Internet Explorer®, Chrome®, Safari®, Dolphin®, etc.

User computing device 100 may be a laptop computer, tablet computer, netbook computer, personal computer (PC), a desktop computer, a tablet computer, a smart phone, or any programmable electronic device that may operate in accordance with embodiments of the invention. User computing device 100 may generally be described with relation to FIG. 3.

Corpus 130 represents a store of data in documents that may be automatically indexed. Corpus 130 may contain web pages, images, news articles, and other documents. In an exemplary embodiment, corpus 130 may be the documents available on the Internet that are accessible to search engine 110.

Search engine 110 represents a search engine that may receive search queries from user computing device 100, search an index of corpus 130 for relevant documents, and return a ranked listing of the documents to user computing device 100. Search engine 110 may reside on a server 150 that supports the operation of and communications with the search engine.

Server 150 may be a laptop computer, netbook computer, personal computer (PC), a desktop computer, or any programmable electronic device that may operate in accordance with embodiments of the invention. Server 150 may generally be described with relation to FIG. 3.

As mentioned above, if the search query can be parsed to a request to solve an equation, or to execute code, then if a web page result selected by the requestor contains the equation, or code, the search engine may execute the equation, or code with the values supplied in the search query.

Search engine 110 contains web crawler 112, indexing module 114 with associated document index 116, query parser 118, search results 120, executable create module 122, and GUI module 124. Web crawler 112 is a web bot that systematically browses the documents in corpus 130 for the purpose of creating an index, for example, document index 116, of the contents of the browsed documents. Web crawler 112 may operate in accordance with a set of policies, including, for example, a selection policy that states which pages to download, a re-visit policy that states when to check for changes to the pages, a politeness policy that states how to avoid overloading Web sites, and a parallelization policy that states how to coordinate distributed web crawlers. In various embodiments, the selection policy may increase the priority of documents that can be determined by the crawler to contain equations, or code. In an embodiment, web crawler 112 may download the documents in corpus 130 that it browses into a data store, for example, a data store on computer readable storage media 308 (FIG. 3) that may be used to create an index. Web crawler 112 may be any of the commercially available or open source web crawlers in the marketplace that may be implemented in accordance with an embodiment of the invention.

Indexing module 114 represents the functionality for creating a document index 116 of the documents returned by web crawler 112. As mentioned above, the indexing functionality may be quite complex, and incorporate interdisciplinary concepts from linguistics, cognitive psychology, mathematics, informatics, physics, and computer science. The indexing function may tokenize, parse, and further process the text content of a document, according to, for example, natural language rules. In various embodiments, the indexing functionality may focus on a more traditional full-text indexing of natural language content in the documents returned by web crawler 112. In certain embodiments, the indexing functionality may include aspects of mathematical equation, and code indexing, as referenced above.

Figure 3:
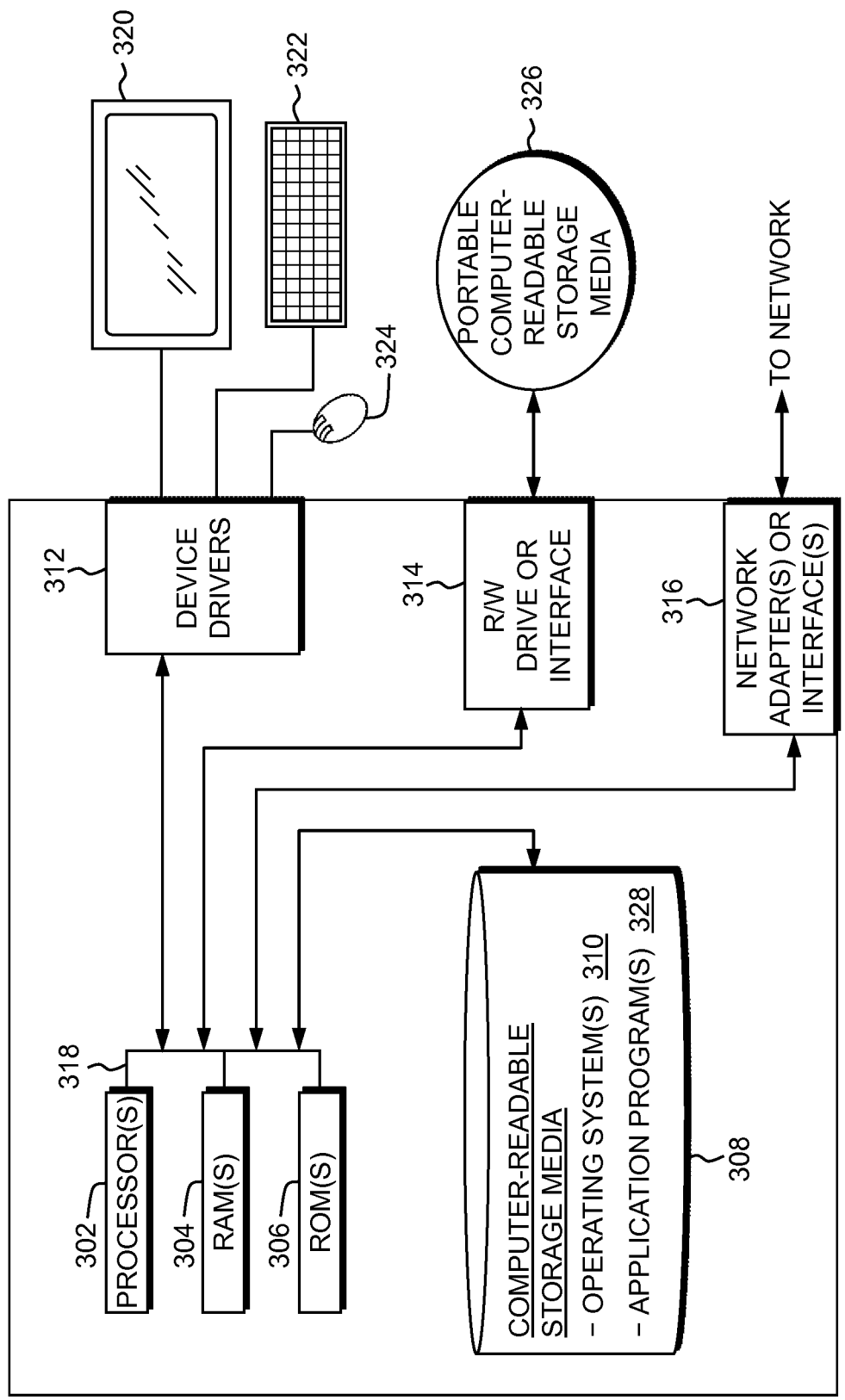
FIG. 3 is a functional block diagram of components of a user computing device and a server, in accordance with an embodiment of the present invention.

Document index 116 is the data structure that is searched by search engine 110 in response to receiving a search query. Document index 116 may reside, for example, on computer readable storage media 308 (FIG. 3). Document index 116 may be structured in one or more index or database architectures, including suffix tree, inverted index, citation index, Ngram index, document-term index, etc.

Query parser 118 represents the functionality that receives a search query, produces search terms, and executes a search of a document index or a document. Query parser 118 may tokenize, parse, and further process received search queries, according to natural language rules, and may, for example, include eliminating stop words from the search terms, expanding the search terms based on word stem processing, expansion to include synonyms and related terms in the search, query term weighting, etc. Query parser 118 may include a specialized lexicon directed to equations.

In an exemplary embodiment, query parser 118 performs two types of searches. The first search type is performed on document index 116 when a search query is received by search engine 110, for example, from web browser 102. For this search type, a first set of search terms is parsed from the search query that may be text based. Query parser 118 may parse the search query in a manner complimentary to the web indexing function of indexing module 114 to ensure the search terms from the processed query may effectively align with the document index 116 created by indexing module 114. After the text based search terms have been parsed from the search query, query parser 118 executes a search of document index 116, ranks the results, and returns the ranked results in the form of formatted URLs to web browser 102.

The second search type performed by query parser 118 is on search result web pages that may be selected for retrieval by, for example, a click on one of the formatted URLs displayed in web browser 102. For this search type, query parser 118 may parse an equation, code, or other executable related search terms from the natural language query, according to a specific set of natural language rules, for example, as referenced above. If equation, code, or other executable search terms can be parsed from the natural language query, a search is performed on the selected web page. If the search yields positive results, executable create module 122, as described in more detail below, may generate executable code, for example, Java code, to embed in the selected web page that may execute the equation, code, or other executable with, for example, the values supplied in the search query.

In various embodiments, query parser 118 may parse an equation from the natural language query, according to a specific set of natural language rules, as referenced above. Certain natural language queries lend themselves to parsing into an equation. For example, the following query:

What is the integral of 2 x squared for x between 0 and 4? (1)

lends itself to a parsing of the equation:

$$\int_0^4 2x^2 \, dx \quad (2)$$

In this example, query (1) maybe parsed into, for example, MathML, OpenMath, and/or one or more mathematical notation markup languages, representing equation (2). The elements of the markup language may be used, for example, to search the contents of a search result 120 web page selected by a user via web browser 102.

Other natural language queries may be identified as code oriented. For example, the following query:

How do I display the equation the integral of 2 x squared for x between 0 and 4 in a web page? (3)

may be identified as a code oriented search query, based on the search query phrases "how do I display" and "in a web page." Other tokens in the search query that may be parsed to identify the query as code oriented include, for example, "code", "program", "HTML", etc. When a query is identified as code oriented, a set of search terms may parsed from the search query to include, for example, Java, HTML, XML, or MathML tags, as well as terms appearing in the query, to search a web page to determine if code examples or snippets are displayed that relate to the search query.

Still other natural language queries may be identified as rule oriented. For example, the following queries:

What type of visa do I need to transit through an airport in France? (4)

and

What type of fertilizer is recommended for wheat sown 12 days ago, temperature is 38 C., no rain for the last 3 days, black soil? (5)

may be identified as a rule oriented search queries, based on, for example, parsing of certain legal oriented words in query (4), and the parsing of numerical values in the absence of terms denoting a mathematical equation in query (5). Rule based queries may generally be described as queries in which search results may be parsed to an "If-Then" format. That is, if certain conditions are met, then a result may be triggered. A set of search terms may be parsed to include terms from lexicons directed to rule based queries for searching the contents of a search result 120 web page selected by a user via web browser 102 to identify, for example, procedures, statutes, and other rule based structures.

With regard to the second search type performed by query parser 118 on search result web pages that may be selected for retrieval in web browser 102, web pages selected for display may be intercepted by search engine 110 before transmittal to web browser 102. For example, clicking on one of the formatted URLs displayed in the search result list in web browser 102 may cause a URL redirection script, for example, a Java applet, to be executed that returns the selected web page to search engine 110. This may allow query parser 118 to perform the web page searches described above, and allow additional processing of the web page before delivery to web browser 102.

In an exemplary embodiment, executable create module 122 operates generally to embed a display element in the selected web page that may display in context the answer to the specific computational, code, or procedural search query received by search engine 110. Executable create module 122 may first identify the "boundaries" of the executable identified by performing the second search type, described above, on the selected web page. The web page code defining the executable may then be extracted from the web page. The extracted code may form the basis of an equation that can be "solved" to determine the answer to the specific query, and also to form the basis of a display element for displaying, for example, the equation, including the specific values and the calculated answer parsed from the search query.

Executable create module 122 may identify the "boundaries" of the executable identified by performing the second search type on the selected web page, for example, by identifying start and corresponding end tags for markup language element definitions associated with the executable. For example, if a second search type parses an equation from the search query, and determines that a corresponding equation is on a selected web page, executable create module 122 may use information from the web page search, such as the locations of equation related information on the web page, as starting positions to identify related markup language element definitions on the page. For example, the second search type may identify positions of MathML or OpenMath start tags. Executable create module 122 may identify the executable boundary based on the corresponding end tag. Similarly, if a query is rule based, the second search type may identify the page locations of text corresponding to the parsed search terms. Executable create module 122 may identify the executable boundary based on, for example, table start and end tags that encompass the identified executable on the web page. Once the boundaries of the executable are determined, executable create module 122 may then extract the markup language code defining the executable from the web page.

From the extracted markup language code, executable create module 122 may correlate values supplied in the search query with factors and variable names in the extracted code. For example, it is known to apply techniques from the areas of Hidden Markov Model (HMM) and Conditional Random Field (CRF) statistical modeling to natural language processing tasks, such as parts of speech tagging. Similar techniques may be applied here to identify and label various parts of the text of the search query and the extracted code as variables, values, factors, etc. For example, for the following phrase that may appear on a search result web page:

> If the mass is 20 KG and height is 4 meters, then
> the potential energy can be computed as
> PE=mgh, where g is the gravitational constant,
> m is mass and h is height     (6)

"potential energy" may be identified as a variable name, PE may be identified as a variable name corresponding to "potential energy," "mass" may be identified as a variable name, "20 KG" may be identified as a value of mass, "height" may be identified as a variable name, "4 meters" may be identified as a value of height, and PE=mgh as an equation relating all the variables.

In a similar manner, for a search query such as:

> What is the potential energy of an object that is 3
> meters high weighing 15 KG?     (7)

"weight" may be identified as a variable name, "15 KG" may be identified as a value of weight, "height" may be identified as a variable name, "3 meters" may be identified as a value of height, and "potential energy" may be identified as a variable name.

Natural language processing may, for example, match the variable names identified in the extracted code defining the executable in the selected search result web page with the corresponding variable names in the search query, and form an equation to solve by assigning the values identified in the search query to corresponding variable names identified in the extracted code. When the equation to solve has been identified, the equation may be solved, for example, by a formatted call to a routine in a Java-based mathematical or scientific software library. The software library may be, for example, one of the commercially available or open source mathematical or scientific software libraries, in accordance with an embodiment of the invention.

When the identified equation has been solved by, for example, a formatted call to a routine in a Java-based mathematical or scientific software library, the answer value may be displayed in context with the equation to solve in a display element embedded in the selected search result web page that is sent to web browser 102. For example, as described above, the boundaries of the executable may be determined and the code defining the executable may be extracted. The variable names, factors, etc., in the equation to solve may be identified in the extracted code and the search query using HMM and/or CRF statistical modeling techniques in conjunction with natural language processing tasks. Values associated with the variable names may be substituted for the variable names in the extracted code defining the executable, and the extracted code may be formed into a display element to embed in the selected search result web page. For example, the display element may display in a bordered box at the top of the web page, or near the executable in the web page.

If the search query is rule based, executable create module 122 may, as described above, identify the page locations of text corresponding to the parsed search terms, identify the executable boundary based on, for example, table start and end tags that encompass the identified executable on the web page, and extract the markup language code defining the executable from the web page. Using natural language processing of the extracted text corresponding to the parsed search terms, a rule structure may be parsed from the text. For example, rule elements may be identified in the text, for example, by identifying sentences or similar natural language structures in the text. Terms and phrases such as "first", "second", "after", "if", etc., may be used to identify rule element order and dependencies. Using, for example, HMM and/or CRF statistical modeling techniques in conjunction with natural language processing tasks, rule variable names and associated values may be identified in the extracted text and the search query, and the rule variable values in the search query may be associated with the rule variable names identified in the extracted text. Similar to identifying an equation to solve, as described above, a rule to solve may be parsed from the search query. Based on the identified rule to solve, rule elements identified in the extracted text associated with the rule elements may be identified, based on the identified rule order and dependencies. The extracted code may be formed into a display element to embed in the selected search result web page, and the rule elements identified as associated with the rule to solve parsed from the search query may be highlighted in the display element.

If the search query is code based, executable create module 122 may, as described above, identify the page locations of code text corresponding to the parsed search terms, identify the executable boundary based on, for example, appropriate start and end tags that encompass the identified executable on the web page, and extract the markup language code defining the executable from the web page. If the search query includes specific variable names and associated values, these may be parsed from the search query and the extracted executable code using, for example, HMM and/or CRF statistical modeling techniques in conjunction with natural language processing tasks. The extracted executable may be formed into a display element to embed in the selected search result web page, and the specific variable values parsed from the search query may be substituted into the extracted executable, and may be highlighted in the display element. In certain embodiments, the code in the extracted executable may be formed into a Java applet and executed, for example, in a debug mode to allow display of step-by-step execution of the code. For example, if Java Eclipse®, NetBeans®, or another Java-based integrated development environment is installed on user computing device 100, the created Java applet may include appropriate calls to execute the created Java applet in step-by-step debug mode.

After a display element based on the extracted executable has been created and embedded in the selected search result web page, in accordance with embodiments of the invention, the web page may be transmitted to web browser 102 on user computing device 100 for display to, for example, a user of the web browser.

Figure 2A:
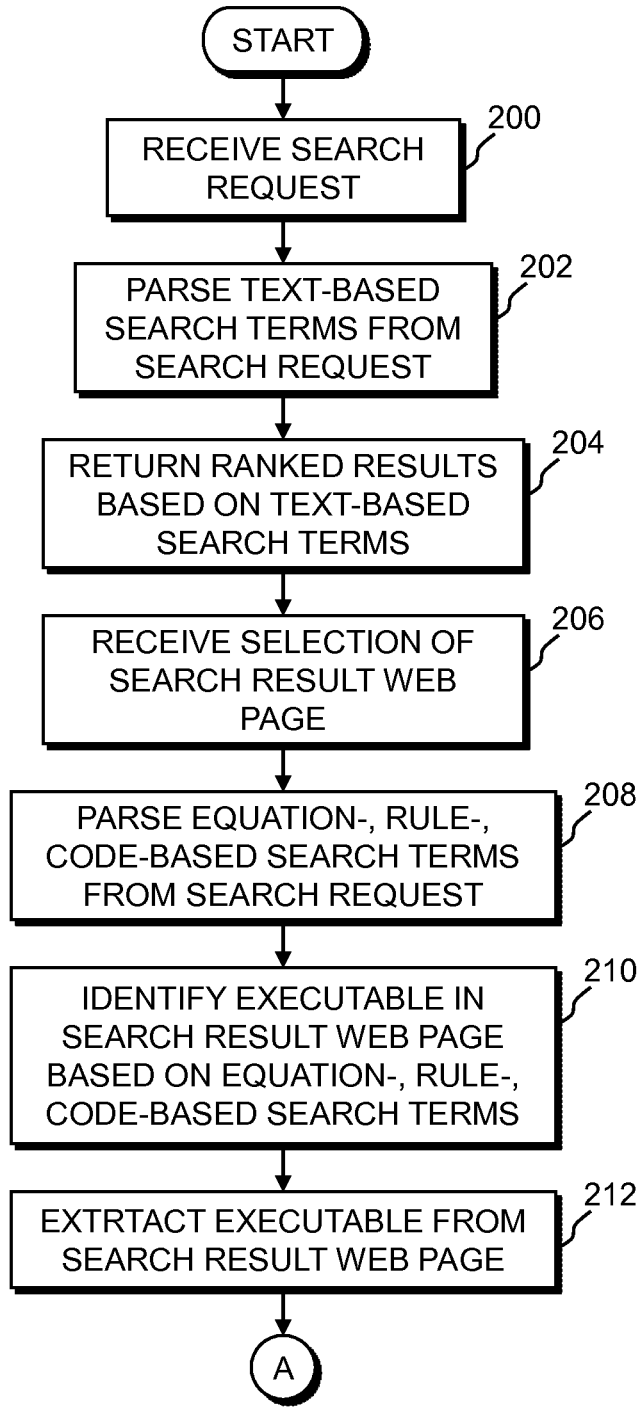
FIGS. 2A and 2B are a flowchart depicting operational steps of the search engine within the enhanced search environment of FIG. 1, in accordance with an embodiment of the present invention.
Figure 2B:
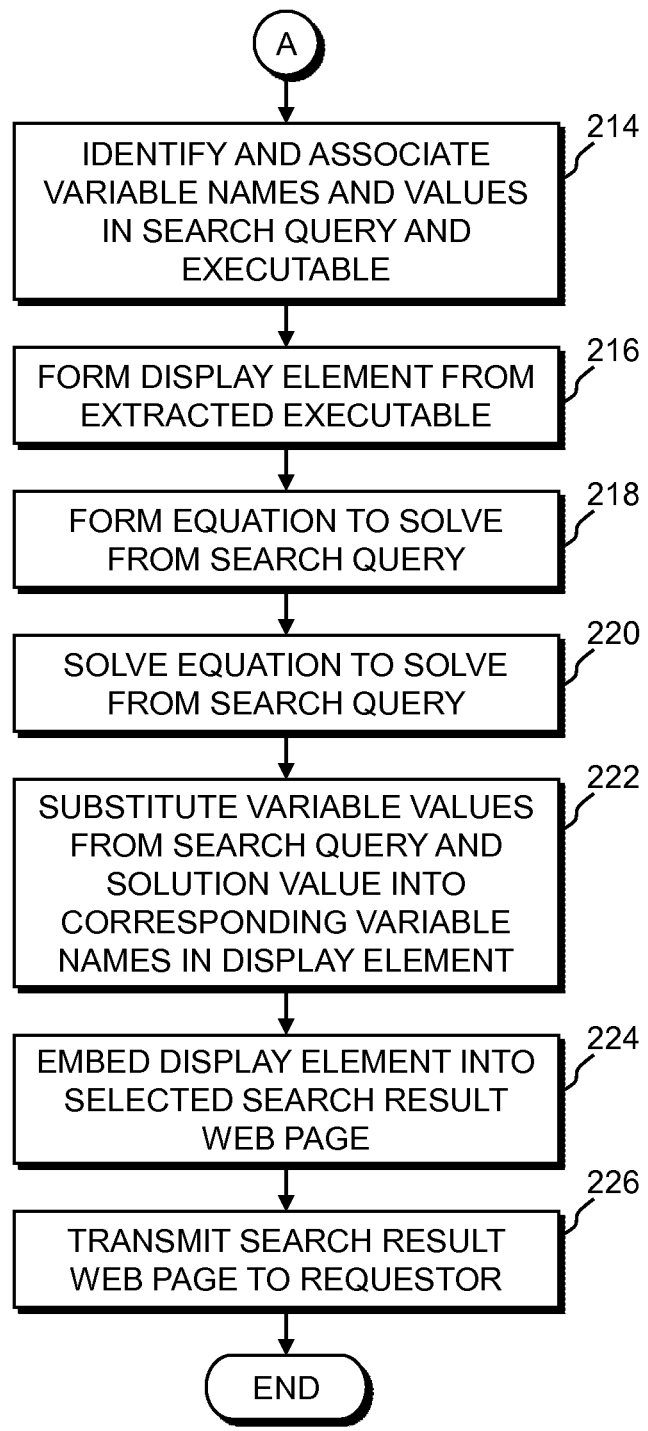

FIGS. 2A and 2B are a flowchart depicting operational steps of search engine 110, in accordance with an embodiment of the present invention. Search engine 110 may receive a search request from, for example, web browser 102 (step 200). Query parser 118 may parse the search query to form text-based search terms (step 202). Query parser may search document index 116 to identify web pages that contain the search terms, and rank the results. The ranked results may be returned to web browser 102 (step 204). Search engine 110 may receive a selection of a search result web page from web browser 102 (step 206).

Query parser 118 may parse the search query to identify search terms in the query specific to equations, code, or other executables (step 208). Executable create module 122 may identify an executable in the search result web page, based on the location in the selected web page of the location in the web page of search terms specific to equations, code, or other executables (step 210). Executable create module 122 may then extract the executable from the search result web page (step 212).

Based on, for example, statistical modeling techniques in conjunction with natural language processing tasks, executable create module 122 may identify variable names and associated variable values in the search query and in the extracted executable (step 214). Executable create module 122 may form a display element from the extracted executable to embed in the selected search result web page (step 216). Executable create module 122 may form an equation to solve (step 218), based on parsing the search query, and solve the equation (step 220) by, for example, formatting a call to a routine in a mathematical or scientific software library. Executable create module 122 may then substitute the variable values parsed from the search request, and the computed solution, into the corresponding variable names in the display element (step 222). The display element may then be embedded into the select search result web page (step 224) and transmitted to, for example, web browser 102 for display to the requestor (step 226).

In certain embodiments, the search query may be identified as code or rule based. In these embodiments, the display elements may include a Java applet formed from a code-based executable extracted from the selected search result web page, that is executed, for example, in a step-by-step debug mode, or the display element may include a rule based executable, with specific rule elements identified as associated with the search query, highlighted.

FIG. 3, in various embodiments, may depict a block diagram of components of user computing device 100 and/or server 150, which may be the same computing device or different computing devices, in accordance with an embodiment of the present invention. It should be appreciated that FIG. 3 provides only an illustration of one implementation and does not imply any limitations with regard to the environments in which different embodiments may be implemented. Many modifications to the depicted environment may be made.

User computing device 100 and/or server 150 can include one or more processors 302, one or more computer-readable RAMs 304, one or more computer-readable ROMs 306, one or more computer readable storage media 308, device drivers 312, read/write drive or interface 314, network adapter or interface 316, all interconnected over a communications fabric 318. Communications fabric 318 can be implemented with any architecture designed for passing data and/or control information between processors (such as microprocessors, communications and network processors, etc.), system memory, peripheral devices, and any other hardware components within a system.

One or more operating systems 310 and application programs 328, which may include web browser 102 and/or search engine 110, are stored on one or more of the computer-readable storage media 308 for execution by one or more of the processors 302 via one or more of the respective RAMs 304 (which typically include cache memory). In the illustrated embodiment, each of the computer-readable storage media 308 can be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable storage media that can store a computer program and digital information.

User computing device 100 and/or server 150 can also include a R/W drive or interface 314 to read from and write to one or more portable computer-readable storage media 326. Application programs 328 on user computing device 100 and/or server 150 can be stored on one or more of the portable computer-readable tangible storage media 326, read via the respective R/W drive or interface 314 and loaded into the respective computer-readable tangible storage media 308.

User computing device 100 and/or server 150 can also include a network adapter or interface 316, such as a TCP/IP adapter card or wireless communication adapter (such as a 4G wireless communication adapter using OFDMA technology). Application programs 328 on user computing device 100 and/or server 150 can be downloaded to the computing device from an external computer or external storage device via a network (for example, the Internet, a local area network or other, wide area network or wireless network) and network adapter or interface 316. From the network adapter or interface 316, the programs are loaded into the computer-readable tangible storage media 308. The network may comprise copper wires, optical fibers, wireless transmission, routers, firewalls, switches, gateway computers and/or edge servers.

User computing device 100 and/or server 150 can also include a display screen 320, a keyboard or keypad 322, and a computer mouse or touchpad 324. Device drivers 312 interface to display screen 320 for imaging, to keyboard or keypad 322, to computer mouse or touchpad 324, and/or to display screen 320 for pressure sensing of alphanumeric character entry and user selections. The device drivers 312, R/W drive or interface 314 and network adapter or interface 316 can comprise hardware and software (stored in computer-readable tangible storage device 308 and/or ROM 306).

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Based on the foregoing, a computer system, method and program product have been disclosed for a presentation control system. However, numerous modifications and substitutions can be made without deviating from the scope of the present invention. Therefore, the present invention has been disclosed by way of example and not limitation.

What is claimed is:

1. A computer program comprising:
one or more non-transitory computer-readable storage media and program instructions stored on the one or more non-transitory computer-readable storage media, the program instructions comprising:
program instructions to parse one or more terms from a search query;
program instructions to search for a document based on the one or more parsed terms;
program instructions to identify and extract a portion of the document that contains an executable, wherein the executable is an equation;

program instructions to display the portion of the document that can form the basis for an executable code and an answer to the search query, wherein the answer to the search query is based on the executed portion of code and displayed alongside results of the search query, thereby improving efficiency and search speed;

program instructions to associate the one or more parsed terms with corresponding variable names in the identified portion of the document that contains the executable;

program instructions to generate the executable code, wherein the executable code is based on the one or more parsed terms and the portion of the document that contains the executable;

program instruction to embed the executable code in the portion of the document that contains the executable; and program instructions to execute the generated executable code using the associated one or more parsed terms, thereby answering the search query.

2. A computer program product in accordance with claim 1, wherein each of the one or more parsed terms is one of: equation based, rule based, and code based.

3. A computer program product in accordance with claim 1, wherein the identified portion of the document that can form the basis for the executable code is identified by boundaries of the identified portion of the document that includes the one or more parsed terms.

4. A computer program product in accordance with claim 1, wherein the variable names in the identified portion of the document are identified using Hidden Markov Model statistical modeling in conjunction with natural language processing.

5. A computer program product in accordance with claim 1, wherein the generated executable code is a Java applet.

6. A computer program product in accordance with claim 1, wherein the document is received from a search engine.

7. A computer program product in accordance with claim 1, wherein the document is a mark-up language document.

8. A computer system comprising:
one or more computer hardware processors, one or more computer-readable storage media, and program instructions stored on one or more of the computer-readable storage media for execution by at least one of the one or more processors, the program instructions comprising:
program instructions to parse one or more terms from a search query;
program instructions to search for a document based on the one or more parsed terms;
program instructions to identify and extract a portion of the document that contains an executable, wherein the executable is an equation;
program instructions to display the portion of the document that can form the basis for an executable code and an answer to the search query, wherein the answer to the search query is based on the executed portion of code and displayed alongside results of the search query, thereby improving efficiency and search speed;
program instructions to associate the one or more parsed terms with corresponding variable names in the identified portion of the document that contains the executable;
program instructions to generate the executable code, wherein the executable code is based on the one or more parsed terms and the portion of the document that contains the executable;
program instruction to embed the executable code in the portion of the document that contains the executable; and
program instructions to execute the generated executable code using the associated one or more parsed terms, thereby answering the search query.

9. A computer system in accordance with claim 8, wherein each of the one or more parsed terms is one of: equation based, rule based, and code based.

10. A computer system in accordance with claim 8, wherein the identified portion of the document that can form the basis for the executable code is identified by boundaries of the identified portion of the document that includes the one or more parsed terms.

11. A computer system in accordance with claim 8, wherein the variable names in the identified portion of the document are identified using Hidden Markov Model statistical modeling in conjunction with natural language processing.

12. A computer system in accordance with claim 8, wherein the generated executable code is a Java applet.

13. A computer system in accordance with claim 8, wherein the document is received from a search engine.

14. A computer system in accordance with claim 8, wherein the document is a mark-up language document.

15. A computer program comprising:
one or more non-transitory computer-readable storage media and program instructions stored on the one or more non-transitory computer-readable storage media, the program instructions comprising:
program instructions to parse one or more terms from a search query;
program instructions to search for a document based on the one or more parsed terms;
program instructions to identify and extract a portion of the document that contains an executable, wherein the executable is a rule;
program instructions to display the portion of the document that can form the basis for an executable code and an answer to the search query, wherein the answer to the search query is based on the executed portion of code and displayed alongside results of the search query, thereby improving efficiency and search speed;
program instructions to associate the one or more parsed terms with corresponding variable names in the identified portion of the document that contains the executable;
program instructions to generate the executable code, wherein the executable code is based on the one or more parsed terms and the portion of the document that contains the executable;
program instruction to embed the executable code in the portion of the document that contains the executable; and
program instructions to execute the generated executable code using the associated one or more parsed terms, thereby answering the search query.

* * * * *